May 26, 1970  G. A. VANDERVELL  3,513,520
METHOD OF MAKING COMPOSITE METAL BEARING STRIPS
Filed Feb. 20, 1967
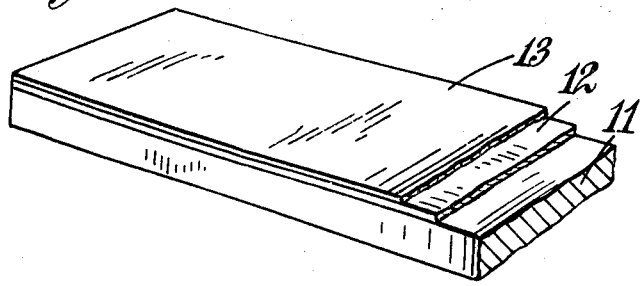
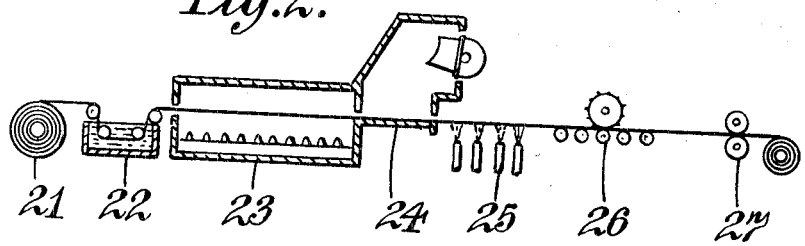
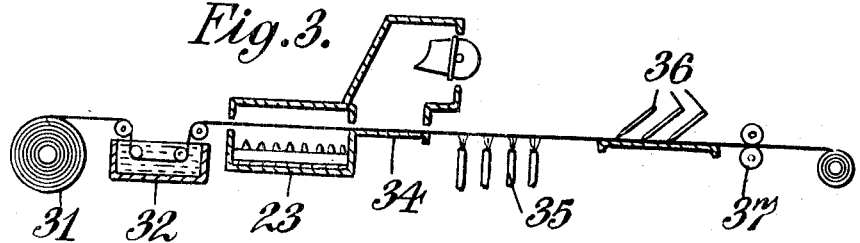
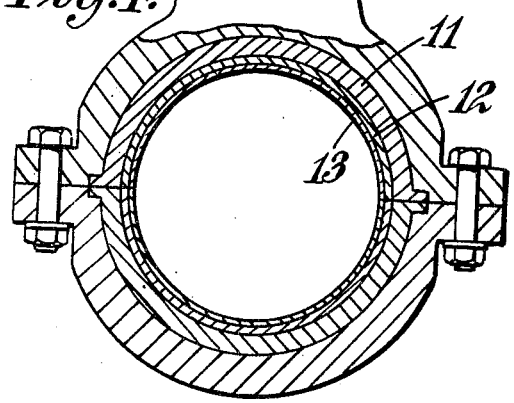

United States Patent Office 3,513,520
Patented May 26, 1970

3,513,520
METHOD OF MAKING COMPOSITE METAL BEARING STRIPS
Guy Anthony Vandervell, London, England, assignor to Vandervell Products Limited, London, England, a British company
Filed Feb. 20, 1967, Ser. No. 617,366
Claims priority, application Great Britain, Feb. 23, 1966, 7,995/66
Int. Cl. B21d *53/10;* B23k *31/02;* B23p *17/00*
U.S. Cl. 29—149.5                                    8 Claims

ABSTRACT OF THE DISCLOSURE

A method of making a composite strip by casting onto a steel backng layer, in a reducing atmosphere, a copper lead alloy, and cooling the resulting two layer strip, and subsequently reheating the steel backing and copper layer in a reducing atmosphere and applying in a molten condition a lead tellurium alloy and subsequently cooling the resulting three layer strip.

---

The invention provides a method of manufacturing a composite strip for use in the manufacture of bearings comprising the steps of bonding an alloy containing copper and lead in a reducing atmosphere onto a steel backing strip at a temperature of 1000–1200° C., cooling the coated backing strip to approximately 20° C., machining and rolling the coating to selected dimensions, melting an alloy containing lead and tellurium, which latter is free of indium or combined with indium in proportions not greater than 2% of the weight of the alloy of lead and tellurium, heating in a reducing atmosphere the backing strip with the coating of the copper lead alloy to a temperature between the melting points of the copper and lead alloy and of the lead and tellurium alloy, applying the melted alloy of lead and tellurium in a layer onto the coating of lead and copper, thereafter cooling the backing strip, with the copper lead alloy coating and the layer of lead and tellurium alloy thereon to substantially room temperature in a selected short time so that controlled transfer of tellurium from said layer into the coating and transfer of copper from the coating into the lead/tellurium layer is effected, and mechanically removing the lead and tellurium alloy surface to leave a thickness of approximately five-thousands of an inch.

Tellurium performs the function of a corrosion inhibiting additive to certain lead alloys and also assists in preserving the mechanical properties of lead when used in connection with plain bearings.

Preferably, the alloy of lead and tellurium contains 0.05–0.25% of tellurium with or without up to 0.5% silver together with 0.1–3% copper and with up to 2% indium.

The amount of indium present may vary from about 2% when 0.05% tellurium is employed to 0.09% when 0.25% tellurium is employed the lower limit of indium representing the amount that it may be present as an impurity in the lead.

The copper and lead alloy preferably contains 5–35% lead. It may contain additionally up to 20% of tin and/or zinc, and up to 0.60% of iron.

According to a preferred feature of the invention, the alloy of lead and tellurium is heated to approximately 450° C. to melt it, and the backing strip with the said coating is delivered at a temperature of approximately 650° C. to a casting unit in which the melted alloy of lead and tellurium is applied in a layer onto said coating of said backing strip and the backing strip with the said coating and the said layer is cooled to approximately 20° C. in three seconds.

The backing strip may be of steel comprising 0.04–0.13% carbon, 0.25–0.45% manganese, up to 0.15% silicon, up to 0.05% sulphur, up to 0.05% phosphorus, and the remainder iron and impurities.

Preferably, the transfer of copper from said coating to said layer is so controlled that the layer contains 0.1–3% copper.

The preferred copper content is about 0.2% and this can be obtained by control of the temperatures and cooling rates of the composite three layer material immediately after application of the lead-tellurium alloy, although, if desired, some of the copper may be added to the molten lead-tellurium alloy before application.

The amount of copper dissolved in the lead alloy during strip coating is dependent partly on the time of contact between the molten lead alloy and the hot copper alloy (i.e. the time lapse before solidification occurs) and partly on the thickness of the three layers.

One specific construction of a composite strip according to the invention and its method of manufacture will now be described with reference to the accompanying drawings in which:

FIG. 1 is a perspective view of the finished strip showing the separate layers;

FIGS. 2 and 3 are diagrammatic illustrations of a method of producing composite strip; and FIG. 4 is a section through a bearing assembled in a connecting rod.

Referring to FIG. 1, the strip comprises a mild steel backing layer 11 (identified by specification No. SAE 1010), an intermediate layer 12, and a surface bearing layer 13. The layers have the following compositions:

| The steel backing layer: | Percent |
|---|---|
| Carbon | 0.8 |
| Manganese | .3 |
| Silicon | .01 |
| Sulphur | .03 |
| Phosphorus | .03 |
| Iron & Impurities remainder. | |

| The intermediate layer: | Percent |
|---|---|
| Lead | 28 |
| Tin | .01 |
| Iron | 0.3 |
| Copper & Impurities remainder. | |

| The surface bearing layer: | Percent |
|---|---|
| Tellurium | 0.05–0.25 |
| Copper | 0.2 |

Lead/indium and impurities remainder, indium being present in proportion of about 2% of the lead/tellurium copper when the lower limit of tellurium is employed i.e. .05% and about 0.09% when the upper limit of 0.25% tellurium is employed, the thickness of the above three layers being (in thousandths of an inch) of 80, 12 and 5 respectively.

The process illustrated in FIGS. 2 and 3 is as follows:

The rolled mild steel strip passes from a coil 21 to be cleaned and degreased in a solvent bath 22 (or, if desired, by passing through solvent vapour, or by any other method), and then passes through a furnace 23 where it is heated to a temperature of 1000–1200° C. in a reducing atmosphere of 10% hydrogen, 10% carbon monoxide, and the remainder nitrogen, the dew-point being maintained below 5° C. The hot steel strip, still within this atmosphere then passes into a casting unit where it forms the continuously moving base of a box 24 into which molten copper alloy is poured. The emergent strip passes over a series of oil or water sprays 25 which quench the strip so that the copper alloy solidifies on the surface of the steel to form a bimetallic strip. The quenching is continued until the strip is at a temperature of 20° C. The copper alloy surface is then accurately machined and rolled to a thickness of twelve thousandths of an inch by milling cutter 26 and smoothing rollers 27 and is recoiled.

Referring to FIG. 3, the bimetallic strip produced as just described, passes from a coil 31 to be cleaned and degreased in bath 32 (or otherwise, if desired) and then passes through a furnace 33 where it is heated to a temperature of 650° C. in a reducing atmosphere similar to that described above. The heated strip, still in this atmosphere passes into a casting unit 34 similar to unit 24 (FIG. 2) where molten lead alloy at 450° C. is poured onto and spread over the copper alloy surface. The lead alloy comprises 0.25% tellurium and 2% copper and the remainder lead and there may also be present as an impurity indium in proportion not greater than 0.09% by weight of the alloy. Approximately 1½ seconds after passing through the casting unit, the strip passes over water sprays 35 which cool the strip and solidify the lead alloy. The cooling is continued down to 20° C. which temperature is attained in 3 seconds. The strip subsequently passes under a series of fixed knives 36 which skive off the surface of the lead alloy to leave a uniform thickness of the alloy on top of the copper alloy. At this stage, the thickness of the lead alloy is five-thousandths of an inch. The composite strip then passes through smoothing rollers 37 and is coiled.

The strip is afterwards blanked and formed into bearings, which are ultimately finish machined so that the surface bearing layer is two-thousandths of an inch thick. FIG. 4 shows a section through an assembled bearing showing the strip in position with the bearing layer 13 innermost.

I claim:

1. A method for the manufacture of a composite strip for use in the manufacture of bearings comprising the steps:
   (a) of bonding an alloy containing copper and lead in a reducing atmosphere onto a steel backing strip at a temperature of 1000–1200° C.,
   (b) cooling the resulting coated backing strip to approximately 20° C.
   (c) machining and rolling the coating to selected dimensions,
   (d) melting an alloy containing lead and tellurium which latter is free of indium or combined with indium in proportions not greater than 2% by weight of the alloy of lead and tellurium,
   (e) heating in a reducing atmosphere the backing strip with the coating of the copper and lead alloy thereon to a temperature between the melting points of the copper and lead alloy and of the lead and tellurium alloy,
   (f) applying the melted alloy of lead and tellurium in a layer onto the coating of lead and copper, to form a layer of lead/tellurium alloy,
   (g) thereafter cooling the backing strip with the copper and lead alloy coating and the layer of lead and tellurium thereon to substantially room temperature in a selected short time so that controlled transfer of copper from the coating of lead and copper alloy into the lead/tellurium is effected,
   (h) and mechanically removing the lead and tellurium alloy surface to leave a thickness of approximately five-thousandths of an inch of the lead/tellurium alloy.

2. A method according to claim 1 wherein the alloy of lead and tellurium contains 0.05–0.25% of tellurium with or without up to 0.5% silver together with 0.1–3% copper and with up to 2% indium.

3. A method according to claim 2 wherein the amount of indium present may very from about 2% when 0.05% tellurium is employed to about 0.09% when 0.25% tellurium is employed.

4. A method according to any of the preceding claims wherein the copper and lead alloy contains 5–35% lead.

5. A method according to any of claims 1 to 4, wherein the copper and lead alloy contains additionally up to 20% of tin and/or zinc, and up to 0.60% of iron.

6. A method according to any one of claims 1 to 5 wherein the alloy of lead and tellurium is heated to approximately 450° C. to melt it, and the backing strip with the said coating is delivered at a temperature of approximately 650° C. to a casting unit in which the melted alloy of lead and tellurium is applied in a layer onto said coating of said backing strip, and the backing strip with the said coating and the said layer is cooled to approximately 20° C. in three seconds.

7. A method according to any one of claims 1 to 6 wherein the backing strip is of steel comprising 0.04–0.13% carbon, 0.25–0.45% manganese, up to 0.15% silicon, up to 0.05% sulphur, up to 0.05% phosphorus, and the remainder iron and impurities.

8. A method as claimed in any one of claims 1 to 7 wherein the transfer of copper from said coating to said layer si so controlled that the layer contains 0.01–3% copper.

References Cited

UNITED STATES PATENTS

| | | |
|---|---|---|
| 2,283,580 | 5/1942 | Sandler. |
| 2,687,565 | 8/1954 | Schaefer _____ 29—527.3 X |
| 2,704,884 | 3/1955 | Ingels _____ 29—527.1 |
| 3,180,008 | 4/1965 | Elderkin et al. |

THOMAS H. EAGER, Primary Examiner

U.S. Cl. X.R.

29—487, 527.1